(12) United States Patent
Devereux et al.

(10) Patent No.: US 7,613,120 B2
(45) Date of Patent: Nov. 3, 2009

(54) DYNAMIC WIDE AREA NETWORK PACKET ROUTING

(75) Inventors: Steve Devereux, Folsom, CA (US);
Rodney B. Rubert, Rescue, CA (US);
Timothy Verrall, Pleasant Hill, CA (US)

(73) Assignee: Intel Corporation, Santa Clara, CA (US)

( * ) Notice: Subject to any disclaimer, the term of this patent is extended or adjusted under 35 U.S.C. 154(b) by 693 days.

(21) Appl. No.: 11/322,515

(22) Filed: Dec. 30, 2005

(65) Prior Publication Data

US 2007/0153795 A1 Jul. 5, 2007

(51) Int. Cl.
*H04L 12/28* (2006.01)
*H04L 12/56* (2006.01)
(52) U.S. Cl. .................... 370/237; 370/389; 370/401; 709/239
(58) Field of Classification Search .............. None
See application file for complete search history.

(56) References Cited

U.S. PATENT DOCUMENTS

| | | | | |
|---|---|---|---|---|
| 5,732,078 A | * | 3/1998 | Arango | 370/355 |
| 6,137,792 A | * | 10/2000 | Jonas et al. | 370/354 |
| 6,154,445 A | * | 11/2000 | Farris et al. | 370/237 |
| 6,647,007 B1 | * | 11/2003 | Zoernack | 370/352 |
| 6,819,654 B2 | * | 11/2004 | Soloway et al. | 370/238 |
| 6,888,793 B1 | * | 5/2005 | Orui | 370/229 |
| 7,099,277 B2 | * | 8/2006 | Sahinoglu et al. | 370/238 |
| 7,239,631 B1 | * | 7/2007 | Prehofer | 370/389 |
| 2003/0016672 A1 | * | 1/2003 | Rosen et al. | 370/392 |
| 2003/0112755 A1 | * | 6/2003 | McDysan | 370/230 |

* cited by examiner

*Primary Examiner*—Hong Cho
*Assistant Examiner*—Robert C Scheibel
(74) *Attorney, Agent, or Firm*—Schwabe, Williamson & Wyatt, P.C.

(57) ABSTRACT

Methods, apparatuses, articles of manufacture, and systems for creating on a first router a first local route segment, notifying a second router of the first local route segment, receiving by the second router the notification, receiving by the second router a packet destined for a computing device coupled to the first router, routing the packet to its destination over a first (e.g. public) wide area network and the first local route segment, and, on "failure" to route a packet through the first network, routing the packet over a second (e.g. enterprise) wide area network connecting the first and second routers via a second local route segment, are described herein.

28 Claims, 4 Drawing Sheets

US 7,613,120 B2

DYNAMIC WIDE AREA NETWORK PACKET ROUTING

TECHNICAL FIELD

Embodiments relate to the field of data communication, in particular, to methods and apparatuses for routing packets from one routing device to another over a first network, e.g. the Internet, and on "failure" to route packets over the first network, routing the packets over a second network, e.g. a private enterprise wide area network.

BACKGROUND

Continuous advancements in the speed of processors, system memory, routers, networking, and client/server architecture have led to the development of global public networks such as the Internet, global private networks such as private enterprise wide area networks (WANs), and private local area networks (LANs) of increasing speed and usefulness. Often, enterprises will utilize two or even all three of these networks to facilitate the transmission of data. Enterprise traffic between two different physical local area networks may be routed across a WAN, and traffic between an enterprise computing device and a non-enterprise computing device may be routed over a public network.

BRIEF DESCRIPTION OF THE DRAWINGS

Embodiments of the present invention will be described by way of exemplary embodiments, but not limitations, illustrated in the accompanying drawings in which like references denote similar elements, and in which.

DETAILED DESCRIPTION OF ILLUSTRATIVE EMBODIMENTS

Illustrative embodiments of the present invention include, but are not limited to, methods and apparatuses for dynamic fail over from a first (e.g. public) wide area network to another (e.g. enterprise) wide area network. In various embodiments, the methods and apparatuses include creating on a first router a first local route segment, notifying a second router of the first local route segment, receiving by the second router the notification, receiving by the second router a packet destined for a computing device coupled to the first router, routing the packet to its destination over a first (e.g. public) wide area network and the first local route segment, and, on "failure" to route a packet through the first network, routing the packet over a second (e.g. enterprise) wide area network connecting the first and second routers via a second local route segment, are described herein.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the illustrative embodiments; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise. The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
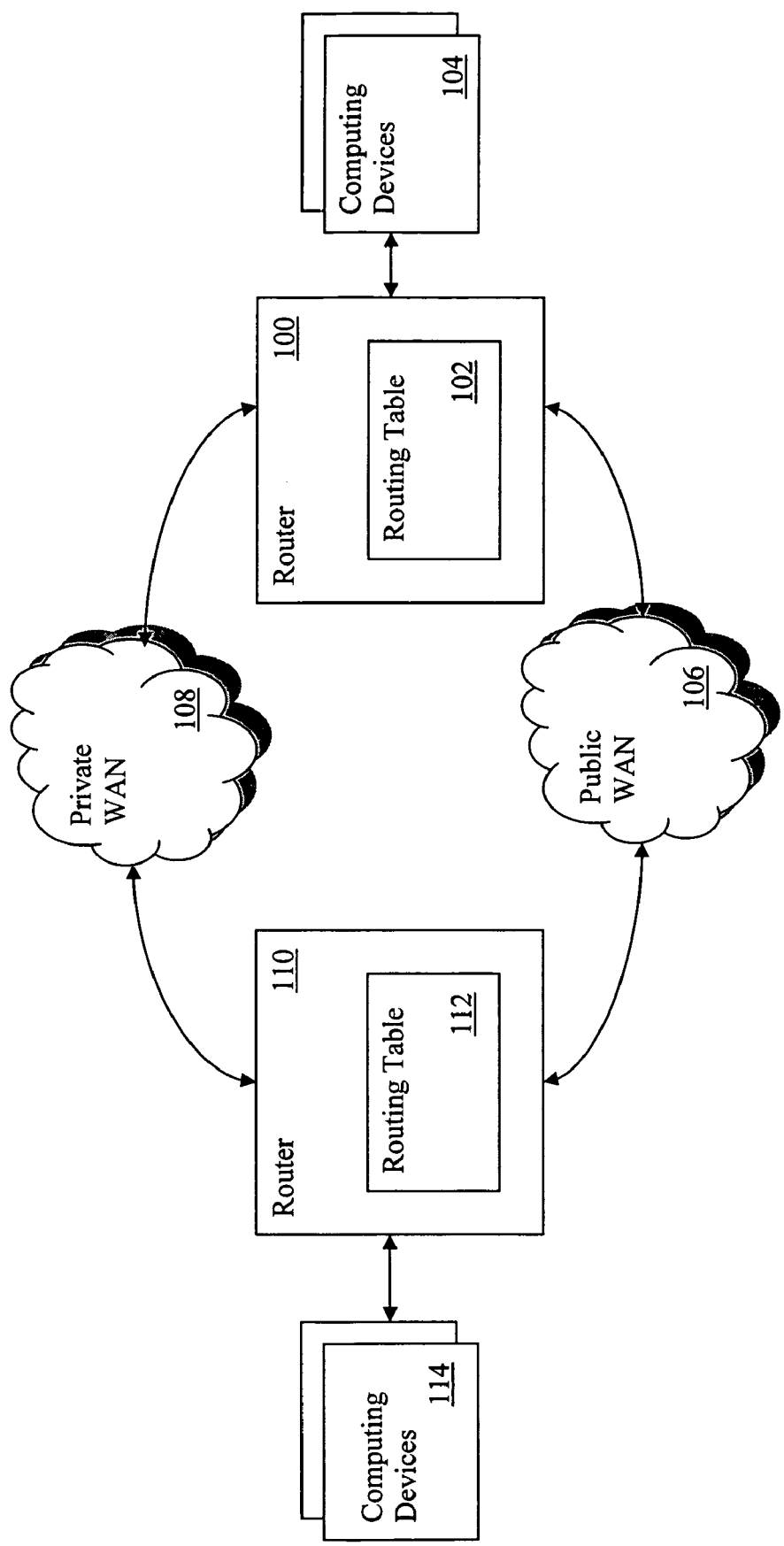
FIG. 1 illustrates an overview of various embodiments of the present invention.

FIG. 1 illustrates an overview of various embodiments of the present invention. As illustrated, router 100 has a routing table 102, and two or more interfaces (not shown) coupling router 100 to public WAN 106, private WAN 108, and one or more computing devices 104, coupled to each other as shown. In some embodiments, one or more computing devices 104 are coupled to router 100 via a LAN, for which router 100 serves as a public and/or private WAN router.

Further, as used herein, a "router" may be any one or more networking devices and/or general or special computer systems capable of receiving packets via an interface coupled to public WAN 106, private WAN 108, or computing devices 104, creating a plurality of local route segments, receiving one or more local route segments, updating routing table 102 with the local route segments, and routing received packets to a next-hop local route segment stored in routing table 102, these operation described in greater detail below.

Routing table 102, as shown, may be any sort of data structure capable of storing multiple local route segments, the local route segments serving as addresses or identifiers of one or more computing devices and/or routers. These local route segments may be addressed by Internet Protocol (IP) addresses, or any other sort of address/identifier known in the art. In various embodiments, routing table 102 will be comprised of two columns and at least one row. The first column may be utilized to store a destination address of a packet received by router 100, and the second column may be utilized to store an address of a router or computing device physically coupled to router 100 that will serve as a "next-hop" router, that is, the next router to which a received packet will be sent on its course to its ultimate destination. This next-hop address may be the same as the destination address when the computing device(s) and/or router(s) to which the packet is destined are physically coupled to router 100. For example, if router 100 receives a packet destined for one of computing devices 104, the local route segment stored in the second column of routing table 102 may be the same as the destination address stored in column one. The data structure serving as routing table 102 need not be an actual table in a database having rows and column. Rather, the data structure may be of any sort known in the art capable of storing a plurality of local route segments.

In various embodiments, router 100 also has a plurality of interfaces providing connectivity to WAN and/or LAN networks, and physical coupling to computing devices and/or LAN or subnet routers. Such interfaces may couple router 100 to public WAN 106, private WAN 108, and/or computing devices 104. The plurality of interfaces may be implemented as one or more ports of router 100, providing connectivity to external networks and devices. Such ports may utilize Transmission Control Protocol/Internet Protocol (TCP/IP) connections or may utilize some other type of connection known in the art, such as Asynchronous Transfer Mode (ATM) virtual connections to provide connectivity.

As shown, computing devices 104 may represent any sort of computing devices known in the art, such as Personal Computers (PCs), workstations, servers, routers, Personal Digital Assistants (PDAs), and/or mobile phones. Computing devices 104 may be directly coupled to router 100, or may be connected to router 100 through one or more LAN and/or subnet routers. As shown, each computing device 104 has a unique physical network address identifying computing device 104 to other computing devices 104 on the same physical network. Each computing device may also have a unique 32 bit IP address identifying the computing device 104 to other computing devices not physically connected to computing device 104, such as a computing device 114 of router 110. A portion of the IP address, such as 24 bits of the address, may be used to identify the LAN or subnet to which computing device 104 is physically coupled. The other portion of the IP address, such as 8 bits, may be mapped by the LAN or subnet router receiving packets destined for computing devices 104 to the physical network address of computing device 104. To facilitate such mapping, the LAN or subnet router may also utilize one or more routing tables. In some embodiments, the LAN or subnet routers may also utilize bit masks such as those commonly known and used in the art, like subnet masks. Such masks may be applied to the IP address of the packet so that only the relevant bits will be read by packet processing modules.

As is further illustrated, public WAN 106 may be any public WAN, such as the Internet, capable of facilitating the routing of packets destined for devices not connected to the LAN or private WAN of the sending computing device. In various embodiments, public WAN 106 may also be utilized for sending private WAN traffic, thereby relieving the burden on the private WAN 108. Packets may be sent directly to other devices of the private WAN 108 over the public WAN 106, or may be first encrypted and sent through a Virtual Private Network (VPN) connection. In some embodiments, router 100 is capable of creating such a VPN connection to router 110 over public WAN 106, and of sending private WAN traffic to router 110 via the VPN connection. In other embodiments, either or both of routers 100 and 110 may be connected to one or more VPN routers (not shown), the VPN routers capable of creating VPN connections and/or encrypting/decrypting packets to be sent over the VPN. In some embodiments, routers 100 and 110 may serve as both WAN and VPN routers. Also, in some embodiments, public WAN 106 may be replaced with some other type of network, such as a private WAN, a LAN, or a subnet (not shown).

Further, private WAN 108, as illustrated, may be any private WAN connecting routers 100 and 110, routers 100 and 110 both being routers of the same private WAN 108. Packets sent from a computing device, such as a one of the plurality of computing devices 114, to another computing device of the same private WAN 108, such as a one of computing devices 104, may be routed by router 100 over private WAN 108, the private WAN 108 being the default network for routing private WAN traffic. Also, in some embodiments, private WAN 108 may be replaced with some other type of network, such as a public WAN, a LAN, or a subnet (not shown).

As illustrated, however, router 100 may facilitate the routing of private WAN traffic over public WAN 106, traffic that would by default be routed over private WAN 108. Router 100 facilitates the routing of private WAN traffic over public WAN 106 by first creating an additional local route segment for one of the plurality of computing devices 104 coupled to router 100. In some embodiments, this additional local route segment may be referred to as a "dummy route" and may facilitate routing traffic destined for the computing device 104 over public WAN 106. A module of router 100 may create this additional local route segment, or a user of router 100 may statically create the local route segment and update the routing table 102 to create an additional row having the additional local route segment as a destination address of incoming packets. Either the module or the user may then create another local route segment associated with the first additional local route segment, the another local route segment serving as a next-hop router address in the updated routing table 102. The another local route segment may, in various embodiments, be the same address as the next-hop router address associated with the private WAN address/local route segment of the computing device 104. Thus, with the updated routing table 102, router 100 may receive both private WAN traffic destined for computing device 104, where the private WAN address is the destination address stored in routing table 102, and public WAN traffic destined for computing device 104, where the additional local route segment (dummy route) is the destination address. Further, in some embodiments, the another local route segment serving as the next-hop for the additional local route segment (dummy route) may be the address of a local subnet or a LAN of which computing device 104 is a member.

Additionally, to facilitate other routers, such as router 110 in routing private WAN traffic over public WAN 106, router 100 may notify other routers, such as router 110, of the additional local route segment (dummy route), the notification being sent over public network 106, which in some embodiments comprises notifying router 110 of the additional local route segment via a secured communication session over a VPN connection of public WAN 106. Once a router such as router 110 has received notification, router 110 may, using a dynamic routing protocol, create an additional entry in its routing table 112 for the private WAN address of computing device 104, listing the additional local route segment (dummy route) as the next-hop route address. Router 110 may then prefer this additional entry in its routing table 112 to an original entry listing some other router of the private WAN 108 as the next-hop for packets destined to computing device 104. On "failure" to route packets through public WAN 106, however, router 110 may, utilizing the dynamic routing protocol, route packets using the original entry in routing table 112 over private WAN 108. The term "failure' as used herein is intended to be application dependent. In some embodiments, "failure" may mean "failure" to receive acknowledgment of receipts of packets sent. In other embodiments, "failure" may mean "failure" to receive acknowledgment of receipts of packets sent consistent with a desired transmission throughput.

As is further illustrated, router 110 has a routing table 112, and two or more interfaces (not shown) coupling router 110 to public WAN 106, private WAN 108, and one or more computing devices 114, in some embodiments comprising a LAN for which router 110 serves as a public and/or private WAN router.

Further, as mentioned above, a "router" is any one or more networking devices and/or general or special computer systems capable of receiving packets via an interface coupled to public WAN 106, private WAN 108, or computing devices 114, creating a plurality of local route segments, receiving one or more local route segments, updating routing table 112 with the local route segments, routing received packets to a next-hop route segment stored in routing table 112 via public WAN 106, and on "failure" to route packets via public WAN 106, routing received packets to a different next-hop route segment stored in routing table 112 via private WAN 108, these operation described in greater detail below.

Routing table 112, as shown, may be any sort of data structure capable of storing multiple local route segments, the local route segments serving as addresses or identifiers of one or more computing devices and/or routers. These local route segments may be IP addresses, or any other sort of address/identifier known in the art. In various embodiments, routing table 112 will be comprised of two columns and at least one row. The first column may be utilized to store a destination address of a packet received by router 110, and the second column may be utilized to store an address of a router or computing device physically coupled to router 110 that will serve as a next-hop router. This next-hop address may be the same as the destination address when the computing device(s) and/or router(s) to which the packet is destined are physically coupled to router 110. For example, if router 110 receives a packet destined for one of computing devices 114, the local route segment stored in the second column of routing table 112 may be the same as the destination address stored in column one. The data structure serving as routing table 112 need not be an actual table in a database having rows and column. Rather, the data structure may be of any sort known in the art capable of storing a plurality of local route segments.

In various embodiments, router 110 also has a plurality of interfaces providing connectivity to WAN and/or LAN networks, and physical coupling to computing devices and/or LAN or subnet routers. Such interfaces may couple router 110 to public WAN 106, private WAN 108, and/or computing devices 114. The plurality of interfaces may be implemented as one or more ports of router 110, providing connectivity to external networks and devices. Such ports may utilize TCP/IP connections or may utilize some other type of connection known in the art, such as ATM virtual connections to provide connectivity.

As shown, computing devices 114 may represent any sort of computing devices known in the art, such as PCs, workstations, servers, routers, PDAs, and/or mobile phones. Computing devices 114 may directly coupled to router 110, or may be connected to router 110 through one or more LAN and/or subnet routers. As shown, each computing device 114 has a unique physical network address identifying computing device 114 to other computing devices 114 on the same physical network. Each computing device may also have a unique 32 bit IP address identifying the computing device 114 to other computing devices not physically connected to computing device 114, such as a computing device 104 of router 100. A portion of the IP address, such as 24 bits of the address, may be used to identify the LAN or subnet to which computing device 114 is physically coupled. The other portion of the IP address, such as 8 bits, may be mapped by the LAN or subnet router receiving packets destined for computing devices 114 to the physical network address of computing device 114. To facilitate such mapping, the LAN or subnet router may also utilize one or more routing tables. In some embodiments, the LAN or subnet routers may also utilize bit masks such as those commonly known and used in the art, like subnet masks. Such masks may be applied to the IP address of the packet so that only the relevant bits will be read by packet processing modules.

As shown, prior to receiving or routing packets from computing devices 114, router 110 receives notification of the additional local route segment (dummy route) from router 100. In other embodiments, receipt of packets and notification may be concurrent. The additional local route segment is the same segment described above as being generated by router 100 to facilitate the routing of private WAN traffic over public WAN 106. The additional local route segment identifies a computing device 104, providing a second address in addition to the private WAN address already possessed by computing device 104. In some embodiments, router 110 receives the notification via an interface coupling router 110 to public WAN 106. Public WAN 106 may facilitate a secure transmission of the notification using a VPN connection, either or both of routers 100 and 110 capable of creating the VPN connection. In other embodiments, the VPN connection may be established by one or more VPN routers coupled to each other via public WAN 106, and coupled to either or both of routers 100 and 110 via private WAN 108 or some LAN or LANs.

Upon receipt of the additional route segments, router 110 may, in some embodiments, distribute the additional local route segment into a dynamic routing protocol such as Enhanced Interior Gateway Routing Protocol (EIGRP), Routing Information Protocol version 2 (RIPv2), or Open Shortest Path First (OSPF), and may list the additional local route segment as a next-hop router address in routing table 112 for packets destined for the computing device 104 associated with the additional local route segment, updating the routing table 112 to create a new entry where destination computing device 104 is associated with the additional route segment as its next-hop router address, this new route being preferred in the dynamic routing protocol to a previous entry in routing table 112 where destination computing device 104 is associated with an address of some other router of private WAN 108 as its next-hop router address.

Subsequent to or concurrent with receiving notification of the additional local route segment, router 110 may, as illustrated, receive one or more packets destined for the computing device 104 associated with the additional local route segment. The packets may be sent by any one or more or computing devices 114, either directly to router 110 or indirectly through a LAN and/or subnet router. Router 110 may receive the one or more packets via an interface or interfaces coupling router 110 to computing devices 114, that interface or interfaces being, in some embodiments, one or more ports of router 110.

In various embodiments, prior to routing the received one or more packets, router 110 may apply one or more routing policies to the packets. The policy may comprise an access-list that directs the traffic source, destination, or port number and may differentiate between packets based on some priority, and direct the routing of such packets accordingly. The routing policy may further perform such functions as rate limiting lower priority packets for transmission at a reduced or maximum bandwidth, or any other routing policy function known in the art. Further, in some embodiments, router 110 may perform the other operations mentioned above and below without applying a routing policy.

As shown, upon receiving one or more packets destined for computing device 104, router 110 routes the one or more packets to computing device 104 over public WAN 106, facilitated by the additional local route segment (dummy route), which routing table 112 has been updated with showing additional local route segment as the next-hop router address for packets destined to computing device 104. The routing over the public WAN may involve the creation and use of one or more VPN connections created by either router 110 or by a VPN router coupled to router 110. The received packets may then be routed, either via public WAN 106, or via a VPN connection of public WAN 106. Either directly or after at least a partial public WAN 106 routing through a plurality of other routers not shown, router 100 may then receive the one or more packets destined for computing device 104, which is coupled to router 100. Router 100 may then use the added entry described above for received packets having the dummy route as the address for routing the packets to computing devices 104 coupled to router 100.

Further, in various embodiments, on "failure" to route packets through the public WAN 106 connection, the dynamic routing protocol utilized by router 110 may then dynamically cease routing packets via public WAN 106 via the additional route segment, and may instead prefer to route the one or more packets via private WAN 108, the routing over private WAN 108 facilitated by a second local route segment having as the next-hop for packets destined to computing device 104 a router of private WAN 108 that is physically coupled to router 110. Upon reestablishment of the public WAN 106 connection, the dynamic routing protocol may then again prefer to route packets destined to computing device 104 via public WAN 106 rather than private WAN 108.

Additionally, is some embodiments, the operations performed by router 100 may also be performed by router 110, and the operations performed by router 110 may also be performed by router 100, or both routers 100 and 110 may perform both sets of operations. Still further, in various embodiments, the present invention may be concurrently practiced by multiple routers 100 and/or routers 110.

Figure 2:
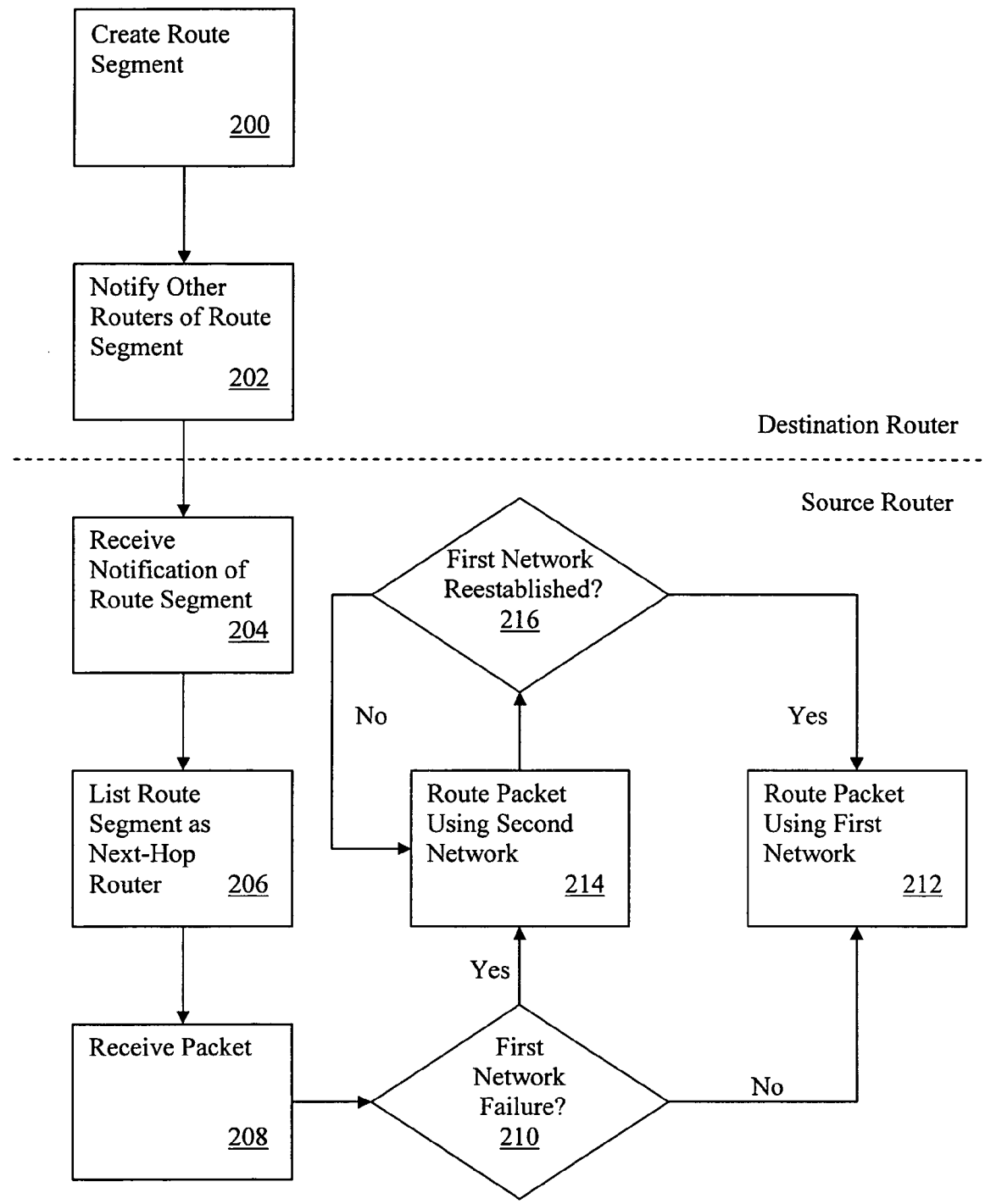
FIG. 2 illustrates a flow chart view of selected operations of the methods of various embodiments of the present invention.

FIG. 2 illustrates a flow chart view of selected operations of the methods of various embodiments of the present invention. As illustrated, a destination router, such as router 100, may facilitate the routing of private WAN traffic over a public WAN such as public WAN 106, traffic that would by default be routed over a private WAN such as private WAN 108. The destination router may facilitate this routing by first creating an additional local route segment for one of a plurality of computing devices coupled to the destination router, such as computing devices 104, block 200. In some embodiments, this additional local route segment may be referred to as a "dummy route" and may facilitate routing traffic destined for a computing device coupled to the destination router over a public WAN. A module of the destination router may create this additional local route segment, or a user of the destination router may statically create the local route segment and update a routing table of the destination router to create an additional row having the additional local route segment as a destination address of incoming packets. Either the module or the user may then create another local route segment associated with the additional local route segment, the another local route segment serving as a next-hop router address in the updated routing table. The another local route segment may, in various embodiments, be the same address as the next-hop router address associated with the private WAN address/local route segment of the destination computing device. Thus, with the updated routing table, destination router may receive both private WAN traffic destined for a computing device of the destination router, where the private WAN address is the destination address stored in routing table, and public WAN traffic destined for a computing device of the destination router, where the additional local route segment (dummy route) is the destination address. Further, in some embodiments, the another local route segment serving as the next-hop for the additional local route segment (dummy route) may be the address of a local subnet or a LAN of which the destination computing device is a member.

Additionally, to facilitate other routers, such as router 110 in routing private WAN traffic over a public WAN, the destination router may notify other routers, such as router 110, of the additional local route segment (dummy route), block 202, the notification being sent over the public network, which in some embodiments comprises notifying a source router of the additional local route segment via a secured communication session over a VPN connection of the public WAN.

As is further shown, the source router, such as router 110, then receives the notification of the additional local route segment (dummy route) sent by the destination router, block 204. In some embodiments, the source router receives the notification via an interface coupling the source router to the public WAN. The public WAN may facilitate a secure transmission of the notification using a VPN connection, either or both of the source and destination routers capable of creating the VPN connection. In other embodiments, the VPN connection may be established by one or more VPN routers coupled to each other via the public WAN, and coupled to either or both of the source and destination routers via a private WAN or some LAN or LANs.

Upon receipt of the additional route segments, the source router may, in some embodiments, distribute the additional local route segment into a dynamic routing protocol such as EIGRP, RIPv2, or OSPF, and may list the additional local route segment as a next-hop router address in a routing table of the source router, block 206, for packets destined for the computing device of the destination router associated with the additional local route segment, updating the routing table to create a new entry where the destination computing device is associated with the additional local route segment as its next-hop router address, this new route being preferred in the dynamic routing protocol to a previous entry in the routing table where the destination computing device is associated with an address of some other router of private WAN as its next-hop router address.

Subsequent to or concurrent with receiving notification of the additional local route segment, the source router may, as illustrated, receive one or more packets destined for the computing device of the destination router associated with the additional local route segment, block 208. The packets may be sent by any one or more computing devices such as computing devices 114, the packets being sent either directly to the source router or indirectly through a LAN and/or subnet router. The source router may receive the one or more packets via an interface or interfaces coupling the source router to computing devices, that interface or interfaces being, in some embodiments, one or more ports.

In various embodiments, prior to routing the received one or more packets, the source router may apply one or more routing policies to the packets (not shown). The policy may comprise an access-list that directs the traffic source, destination, or port number and may differentiate between packets based on some priority, and direct the routing of such packets accordingly. The routing policy may further perform such functions as rate limiting lower priority packets for transmission at a reduced or maximum bandwidth, or any other routing policy function known in the art. Further, in some embodiments, the source router may perform the other operations mentioned above and below without applying a routing policy.

As shown, the source router next determines if the public WAN connection is working, block 210. The source router may accomplish this by "pinging" or any other method of testing a connection known in the art. If the source router determines that the public WAN has not failed, the source router routes the one or more packets to the destination computing device over the public WAN, block 212, facilitated by the additional local route segment (dummy route), which the routing table of the source router has been updated with, showing the additional local route segment as the next-hop router address for packets destined to the destination computing device. The routing over the public WAN may involve the creation and use of one or more VPN connections created by either the source router or by a VPN router coupled to the source router. The received packets may then be routed, either via the public WAN, or via a VPN connection of the public WAN. Either directly or after at least a partial public WAN routing through a plurality of other routers not shown, the destination router may then receive the one or more packets destined for the destination computing device, which is coupled to the destination router. The destination router may then use the added entry described above for received packets having the dummy route as the address for routing the packets to the destination computing devices coupled to the destination router.

Further, in various embodiments, if the public WAN connection has failed to facilitate the routing of packets as desired, the dynamic routing protocol utilized by the source router may then dynamically cease routing packets via the public WAN, facilitated by the additional local route segment, and may instead prefer to route the one or more packets the private WAN, block 214, the routing over the private WAN facilitated by a second local route segment having as the next-hop for packets destined to the destination computing device a router of the private WAN that is physically coupled to the source router. Upon reestablishment of the public WAN connection, block 216, the dynamic routing protocol may then again prefer to route packets destined to the destination computing device via the public WAN rather than the private WAN.

Figure 3:
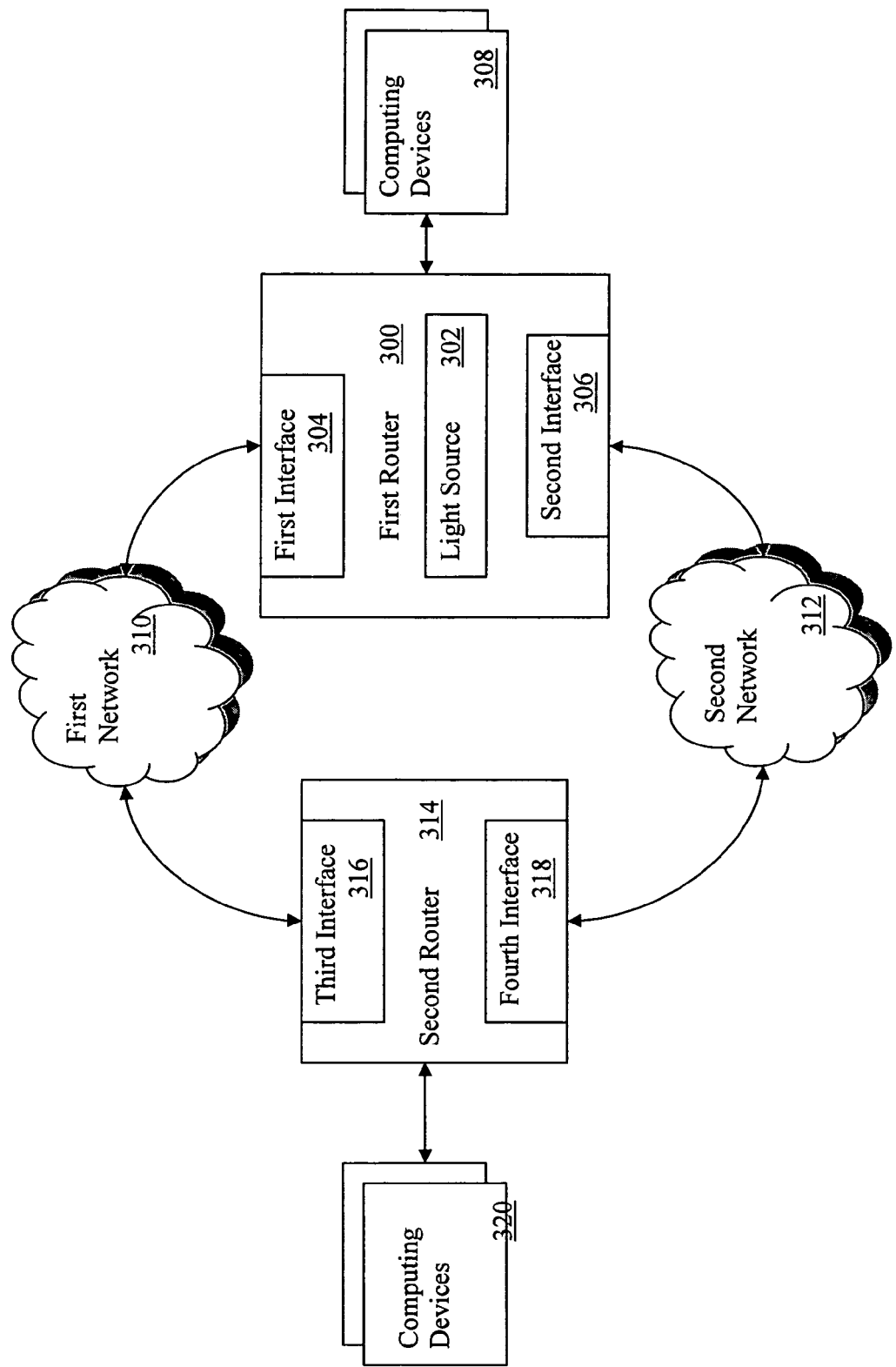
FIG. 3 illustrates a system view of embodiments of the present invention, the system comprising at least a first router having a first routing module and at least one light source.

FIG. 3 illustrates a system view of embodiments of the present invention, the system comprising at least a first router having a first routing module and at least one light source. As illustrated, a first router 300 may have at least one light source 302, first and second interfaces 304 and 306 coupling first router 300 to first network 310 and second network 312, respectively, and a routing module capable of creating local route segments and of notifying other routers of the local route segments, the details of these operations shown in FIGS. 1 and 2, and described in greater detail above.

In various embodiments, first router 300 is the same sort of router as router 100, and has a routing table (not shown) and a plurality of interfaces, such as first interface 304 and second interface 306. Also as shown, first router 300 may be coupled to computing devices 308 and may send packets to and receive packets from computing devices 308, the relationship of first router 300 to computing devices 308 being similar to the relationship between router 100 and computing devices 104, that relationship described in greater detail above.

As shown, first interface 304 may couple first router 300 to first network 310, first network 310 being, in some embodiments, a public WAN like public WAN 106. First interface 304 may be implemented as one or more ports of first router 300, the one or more ports providing connectivity to first network 310.

As is also shown, second interface 306 may couple first router 300 to second network 312, second network 312 being, in some embodiments, a private WAN like private WAN 108. Second interface 306 may be implemented as one or more ports of first router 300, the one or more ports providing connectivity to second network 312.

Further included with first router 300 is at least one light source 302. The light source 302 may be an LED, a cathode ray tube, a light bulb, or any other sort of light emitting device known and used in the art. Additionally, the light source 302 of first router 300 may be used for any number of purposes, including signaling to users of first router 300 any number of types of information, such as "power on", "transmission in progress", "receipt in progress", and so forth.

First network 310, and second network 312, may be any sort of networks known in the art. In various embodiments, first network 310 is a public WAN like public WAN 106, shown and described above, and second network 312 is a private WAN like private WAN 108, shown and described above.

Computing devices 308 may be any sort of computing devices known in the art, such as PCs, workstations, servers, routers, PDAs, and mobile phones. In various embodiments, computing devices 308 are the same sort of computing devices and in the same configuration as computing devices 104.

Also, in various embodiments, the system illustrated by FIG. 3 further comprises a second router having a second routing module. As illustrated, a second router 314 may have third and fourth interfaces 316 and 318 coupling second router 314 to first network 310 and second network 312, respectively, and a routing module capable of receiving notification of a local route segment by another router, listing the notification in a routing table of second router 314, receiving packets from computing devices coupled to second router 314, such as computing devices 320, applying a routing policy to the received packets, routing the packets to a computing device 308 of first router 300 over first network 310, the routing facilitated by the local route segment received from the other router, and on failure to route packets through first network 310, routing the packets over second network 312, the routing facilitated by a second local route segment, the details of these operations shown in FIGS. 1 and 2, and described in greater detail above.

In various embodiments, second router 314 is the same sort of router as router 110, and has a routing table (not shown) and a plurality of interfaces, such as third interface 316 and fourth interface 318. Also as shown, second router 314 may be coupled to computing devices 320 and may send packets to and receive packets from computing devices 320, the relationship of second router 314 to computing devices 320 being similar to the relationship between router 110 and computing devices 114, that relationship described in greater detail above.

As shown, third interface 316 may couple second router 314 to first network 310. Third interface 316 may be implemented as one or more ports of second router 314, the one or more ports providing connectivity to first network 310.

As is also shown, fourth interface 318 may couple second router 314 to second network 312. Fourth interface 316 may be implemented as one or more ports of second router 314, the one or more ports providing connectivity to second network 312.

Computing devices 320 may be any sort of computing devices known in the art, such as PCs, workstations, servers, routers, PDAs, and mobile phones. In various embodiments, computing devices 320 are the same sort of computing devices and in the same configuration as computing devices 114.

Figure 4:
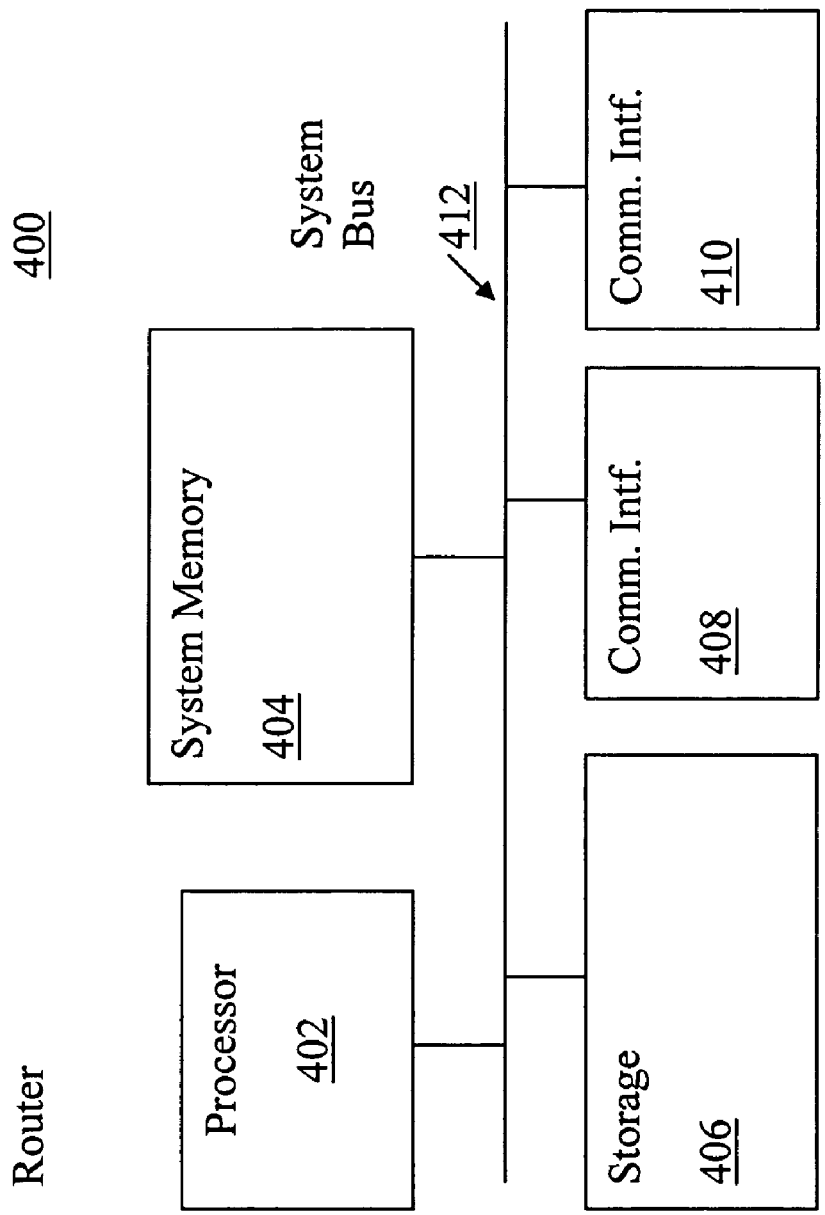
FIG. 4 illustrates an example router suitable for use to practice various embodiments of the present invention.

FIG. 4 illustrates an example router suitable for use to practice various embodiments of the present invention. As shown, router 400 includes one or more processors 402 and system memory 404. Additionally, router 400 includes persistent storage 406 and communication interfaces 408 and 410. The elements are coupled to each other via system bus 412, which represents one or more buses. In the case of multiple buses, they are bridged by one or more bus bridges (not shown). Each of these elements performs its conventional functions known in the art. In particular, system memory 404 and storage 406 are employed to store a working copy of the local route segment generating, local route segment notifying, local route segment receiving, packet receiving, and/or routing processes and a permanent copy of the programming instructions implementing the local route segment generating, local route segment notifying, local route segment receiving, packet receiving, and/or routing processes, respectively. The permanent copy of the instructions implementing the local route segment generating, local route segment notifying, local route segment receiving, packet receiving, and/or routing processes may be loaded into storage 406 in the factory, or in the field, through a distribution medium (not shown) or through one of communication interfaces 408 and 410. The constitution of these elements 402-412 are known, and accordingly will not be further described.

Although specific embodiments have been illustrated and described herein, it will be appreciated by those of ordinary skill in the art that a wide variety of alternate and/or equivalent implementations may be substituted for the specific embodiments shown and described, without departing from the scope of the embodiments of the present invention. This application is intended to cover any adaptations or variations of the embodiments discussed herein. Therefore, it is manifestly intended that the embodiments of the present invention be limited only by the claims and the equivalents thereof.

What is claimed is:

1. A destination router comprising:
   a storage medium to store a first routing table;
   a routing module coupled to the storage medium, and configured to update the first routing table to create a first local route segment, in addition to a second local route segment, for routing packets to a destination device locally coupled with the destination router, the first and second local route segments to route packets received from a first and a second network to the destination device respectively, the first and second networks being different networks, the destination router being enabled to receive routed packets from both the first and second networks, and the destination router further configured to notify a source router of the first local route segment through a communication connection communicatively connecting the routers through the first network, the source router comprising a second routing table, the second routing table being initially configured to route packets destined for the destination device sent from one or more source devices through the second network, the second routing table being additionally updated with the first local route segment as a result of the notification, to enable the source router to route packets destined for the destination device sent from the one or more source devices through the first network instead, the one or more source devices being locally coupled with the source router.

2. The destination router of claim 1, wherein the destination router further includes a processor configured to operate the routing module.

3. The destination router of claim 1, wherein said routing module is configured to update the first routing table to create the first local route segment by updating the first routing table to create a dummy route having a next hop to a local subnet, of which the destination device is a member.

4. The destination router of claim 1, wherein the second network is a private enterprise wide area network, and the destination router further comprises a network interface coupling the destination router to the private enterprise wide area network.

5. The destination router of claim 1, wherein the first network is a public wide area network, the communication connection connecting the routers is a virtual private network connection, and the destination router further comprises a network interface coupling the destination router to the public wide area network, and wherein the routing module is further adapted to establish the virtual private network connection between the routers.

6. The destination router of claim 5, wherein the routing module is further configured to notify the source router of the first local route segment via a secured communication session over the virtual private network connection.

7. The destination router of claim 1, wherein at least a one of the first and second local route segments is an internet protocol address.

8. A method comprising:
   receiving by a source router, from a destination router, a notification of a first local route segment for routing packets sent from one or more source devices locally associated with the source router to a destination device locally associated with the destination router through a first network, to which the first local route segment is coupled, the first network and the first local route segment to be preferred over a second network and a second local route segment the source router is initially configured for routing packets sent from the one or more source devices locally associated with the source router to the destination device locally associated with the destination router, the first and second networks being different networks, and the destination router being enabled to receive routed packets from both the first and second networks;
   additionally updating a source routing table with the first local route segment as a preferred route segment over the second local route segment, as a result of the notification,
   receiving by the source router a first packet from a source device locally associated with the source router, destined for the destination device locally associated with the destination router;
   routing the first packet to the destination device locally associated with the destination router using the first network and the first local route segment instead of the second network and the second local route segment; and
   on failure to receive acknowledgment of receipt of the first packet from the destination device locally associated with the destination router using the first network and the first local route segment consistent with a selected transmission throughput, routing the first packet to the destination device locally associated with the destination router using the second network and the second local route segment notwithstanding the additional update.

9. The method of claim 8, wherein said receiving of the notification of the first local route segment by the source router comprises receiving by the source router, the notification via a secured communication session over a virtual private network connection connecting the source and the destination router.

10. The method of claim 9, wherein the method further comprises establishing the virtual private network connection connecting the source and the destination router.

11. The method of claim 10, wherein said establishing comprises establishing the virtual private network connection over the first network, and the first network is a public wide area network.

12. The method of claim 8, wherein said second network is a private enterprise wide area network.

13. The method of claim 8, wherein the first and second local route segments are internet protocol addresses.

14. The method of claim 8, further comprising, prior to routing or re-routing, applying one or more routing policies to the packets.

15. The method of claim 8, wherein routing the first packet to the destination device locally associated with the destination router using the first network further comprises listing the first local route segment as a next-hop router in a routing table of the source router.

16. An article of manufacture comprising:
a storage medium; and
one of a first programming instructions, a second programming instructions, or both the first and second programming instructions stored in the storage medium;
wherein the first programming instructions, when executed by a processor, program a destination router to enable the destination router to create a first local route segment, in addition to a second local route segment, for routing packets to a destination device locally coupled with the destination router, the first and second local route segments to route packets received from a first and a second network to the destination device respectively, the first and second networks being different networks, and to notify a source router of the first local route segment through a communication connection communicatively connecting the routers through the first network to additionally update the source router to enable the source router to route packets from one or more source devices locally coupled with the source router, destined for the destination device, through the first network, the source router being initially configured to route packets from the one or more source devices destined for the destination device through the second network; and
wherein the second programming instructions, when executed by a processor, program a third router to enable the third router (a) to receive from a fourth router, a notification of a third local route segment for routing packets from devices locally associated with the third router to a device locally associated with the fourth router through a third network, to which the third local route segment is coupled, the third network and the third local route segment to be preferred over a fourth network and a fourth local route segment for routing packets from the devices locally associated with the third router to the device locally associated with the fourth router, the third and fourth networks being different networks, (b) additionally update the third router to include the third local route segment and the third network for routing packets from devices locally associated with the third router to a device locally associated with the third router, the third router being initially configured to route packets from devices locally associated with the third router to a device locally associated with the third router using the fourth local route segment and the fourth network, and (c) to receive by the third router a second packet from a device locally associated with the third router, destined for a device locally associated with the fourth router, to route the second packet to the device locally associated with the fourth router using the third network and the third local route segment; and on failure to route the second packet to the device locally associated with the fourth router using the third network and the third local route segment, routing the second packet to the device locally associated with the fourth router using the fourth network and the fourth local route segment.

17. The article of claim 16, wherein the destination router is the same as the fourth router, the source router is the same as the third router, the first network is the same as the third network, the second network is the same as the fourth network, and/or the first local route segment is the same as the third local route segment.

18. The article of claim 16, wherein the second programming instructions, when executed by a processor, program the third router to receive notification of the third local route segment, said receiving comprising receiving by the third router, the notification via a secured communication session over a virtual private network connection connecting the third and fourth routers.

19. The article of claim 18, wherein the second programming instructions, when executed by a processor, program the third and/or the fourth router to establish the virtual private network connection connecting the third and the fourth router.

20. The article of claim 19, wherein the virtual private network connection is established over the third network, and the third network is a public wide area network.

21. The article of claim 16, wherein said second and/or said fourth networks are private enterprise wide area networks.

22. A system comprising:
a destination router having
at least one light source;
a first and a second networking interface to couple the destination router to a first and a second network respectively, the first and second networks being different networks;
a first routing module coupled to the first and second networking interfaces, and configured to create a first local route segment, in addition to a second local route segment, for routing packets to a destination device locally coupled with the destination router, the first and second local route segments to route packets received from the first and second networks to the destination device respectively, to notify a source router of the first local route segment through a communication connection communicatively connecting the destination and source routers through the first network to enable the source router to route packets from one or more source devices locally coupled with the source router, destined for the destination device, through the first network, and to control the at least one light source, the source router being initially configured to route packets to the destination device from one or more source devices locally coupled to the source router through the second local route segment and the second network, and the source router, in response to the notification, additionally update the source router to preferentially route packets to the destination device from one or more source devices locally coupled to the source router through the first local route segment and the first network.

23. The system of claim 22, further comprising the source router.

24. The system of claim 23, wherein the source router comprises:

a third and a fourth networking interface to couple the source router to the first and the second network respectively;

a second routing module coupled to the third and fourth networking interfaces, and configured to receive by the source router, from the destination router, the notification of the first local route segment for routing packets from one or more source devices locally associated with the source router to a destination device locally associated with the destination router through the first network, to which the first local route segment is coupled, and in response, to additionally update the source router to prefer the first network and the first local route segment over the second network and a third local route segment for routing packets from the source devices locally associated with the source router to the destination device locally associated with the destination router;

receive by the source router a first packet from a source device locally associated with the source router, destined for the destination device locally associated with the destination router;

route the first packet to the destination device locally associated with the destination router using the first network and the first local route segment; and on failure to route the first packet to the destination device locally associated with the destination router using the first network and the first local route segment, route the first packet to the destination device locally associated with the destination router using the second network and the third local route segment.

25. The system of claim 24, wherein the second routing module is further configured to receive notification of the first local route segment, said receiving comprising receiving by the source router, the notification via a secured communication session over a virtual private network connection connecting the destination and the source router.

26. The system of claim 25, wherein the first and/or the second routing module is operatively configured to establish the virtual private network connection connecting the destination and the source router.

27. The system of claim 26, wherein said establishing comprises establishing the virtual private network connection over the first network, and the first network is a public wide area network.

28. The system of claim 24, wherein said second network is a private enterprise wide area network.

* * * * *